United States Patent
Endo et al.

(10) Patent No.: US 11,807,315 B2
(45) Date of Patent: Nov. 7, 2023

(54) CONTROL DEVICE AND CONTROL METHOD FOR USE IN ELECTRIC POWER STEERING DEVICE, AND MOTOR MODULE

(71) Applicants: NIDEC CORPORATION, Kyoto (JP); NIDEC ELESYS CORPORATION, Kanagawa (JP)

(72) Inventors: Shuji Endo, Kyoto (JP); Hiroyuki Ishimura, Kanagawa (JP)

(73) Assignees: NIDEC CORPORATION, Kyoto (JP); NIDEC ELESYS CORPORATION, Kanagawa (JP)

(*) Notice: Subject to any disclaimer, the term of this patent is extended or adjusted under 35 U.S.C. 154(b) by 314 days.

(21) Appl. No.: 17/192,887

(22) Filed: Mar. 5, 2021

(65) Prior Publication Data

US 2021/0276612 A1    Sep. 9, 2021

(30) Foreign Application Priority Data

Mar. 9, 2020   (JP) ................................ 2020-039726

(51) Int. Cl.
*B62D 5/04* (2006.01)

(52) U.S. Cl.
CPC ......... *B62D 5/0472* (2013.01); *B62D 5/0463* (2013.01); *B62D 5/0481* (2013.01)

(58) Field of Classification Search
None
See application file for complete search history.

(56) References Cited

U.S. PATENT DOCUMENTS

| 5,732,373 | A | 3/1998 | Endo | |
| 6,876,911 | B2* | 4/2005 | Chen | B62D 5/0463 701/41 |
| 6,943,512 | B2 | 9/2005 | Kobayashi | |
| 9,008,910 | B2* | 4/2015 | Cottard | B62D 5/0463 701/41 |
| 2020/0262472 | A1* | 8/2020 | Raad | B62D 5/0463 |

FOREIGN PATENT DOCUMENTS

| CN | 102935862 A | * | 2/2013 | ............ B60W 10/20 |
| CN | 102935862 A | | 2/2013 | |
| WO | WO-2017195883 A1 | * | 11/2017 | ............. B62D 5/046 |
| WO | WO-2018070511 A1 | * | 4/2018 | ............ B60W 30/06 |

* cited by examiner

*Primary Examiner* — Peter D Nolan
*Assistant Examiner* — Jacob Kent Besteman-Street
(74) *Attorney, Agent, or Firm* — Hauptman Ham, LLP

(57) ABSTRACT

Both responsiveness and stability of a power assist control system are satisfied. A processor executes, in accordance with a program, determining base assist gain based on steering torque and base assist torque, generating stabilizing compensation torque based on the base assist torque, with use of a stabilizing compensator that has a second-order or higher transfer function in which a frequency characteristic is variable in accordance with the base assist gain and which is expressed using a responsiveness parameter ω and a damping parameter ζ, and generating a current command value for use in control of the motor based on the stabilizing compensation torque.

8 Claims, 6 Drawing Sheets

CONTROL DEVICE AND CONTROL METHOD FOR USE IN ELECTRIC POWER STEERING DEVICE, AND MOTOR MODULE

CROSS-REFERENCE TO RELATED APPLICATIONS

The present invention claims priority under 35 U.S.C. § 119 to Japanese Patent Application No. 2020-039726 filed on Mar. 9, 2020, the entire content of which is incorporated herein by reference.

FIELD OF THE INVENTION

The present disclosure relates to a control device and a control method for use in an electric power steering device, and a motor module.

BACKGROUND

A general automobile is equipped with an electric power steering device (EPS) including an electric motor (hereinbelow referred to simply as a "motor") and a control device for the motor. The electric power steering device is a device that assists the driver's wheel handle (or steering wheel handle) operation by driving the motor. Conventionally known is an electric power steering device including a stabilizing compensator that compensates for the stability of the control device. The stabilizing compensator receives an output from a torque sensor and acts to cancel a peak of a resonance frequency of a resonance system including an inertia element and a spring element of the electric power steering device and acts to improve stability and responsiveness of the power assist control system.

Both responsiveness and stability of the power assist control system are desirably satisfied.

SUMMARY

In a non-limiting and exemplary embodiment, a control device according to the present disclosure is a control device for use in an electric power steering device including a motor and for controlling the motor, and includes a processor, and a memory that stores a program that controls operation of the processor. The processor executes, in accordance with the program, determining base assist gain based on steering torque and base assist torque, generating stabilizing compensation torque based on the base assist torque, with use of a stabilizing compensator that has a second-order or higher transfer function in which a frequency characteristic is variable in accordance with the base assist gain and which is expressed using a responsiveness parameter ω and a damping parameter ζ, and generating a current command value for use in control of the motor based on the stabilizing compensation torque.

In a non-limiting and exemplary embodiment, a motor module according to the present disclosure includes a motor and the aforementioned control device.

In a non-limiting and exemplary embodiment, a control method according to the present disclosure is a control method for use in an electric power steering device including a motor and for controlling the motor, and includes determining base assist gain based on steering torque and base assist torque, generating stabilizing compensation torque based on the base assist torque, with use of a stabilizing compensator that has a second-order or higher transfer function in which a frequency characteristic is variable in accordance with the base assist gain and which is expressed using a responsiveness parameter ω and a damping parameter ζ, and generating a current command value for use in control of the motor based on the stabilizing compensation torque.

The above and other elements, features, steps, characteristics and advantages of the present disclosure will become more apparent from the following detailed description of the preferred embodiments with reference to the attached drawings.

DETAILED DESCRIPTION

Before describing an embodiment of the present disclosure, the findings found by the present inventors and the technical background thereof will be described.

First, a Bode plot will be described with reference to FIG. 7. A graph with gain (or loop gain) represented on the vertical axis and a frequency plotted in a logarithmic scale represented on the horizontal axis is called a gain plot (the graph on the upper side), while a graph with phase represented on the vertical axis and a frequency plotted in a logarithmic scale represented on the horizontal axis is called a phase plot (the graph on the lower side). The combination of these two plots is called a Bode plot. The Bode plot is often used to examine the stability of feedback control. Here, stable control means that oscillation does not occur.

Figure 7:
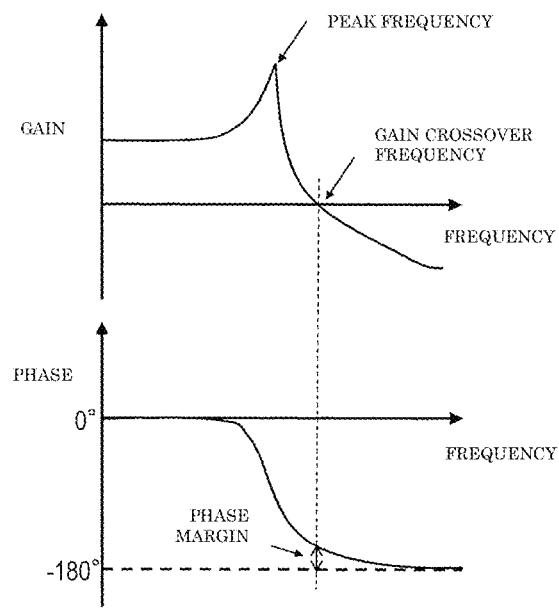
FIG. 7 is a non-limiting and exemplary gain plot.

In FIG. 7, the gain crossover frequency is a frequency at which the gain is 0 dB, that is, one time. The peak frequency is a frequency at which the gain is maximum. An index indicating how much the margin is left until the phase lag reaches 180° when the gain is 0 dB is called a phase margin. The larger the phase margin is, the higher the stability becomes and the lower the responsiveness becomes. Conversely, the smaller the phase margin is, the higher the responsiveness becomes and the lower the stability becomes.

Figure 8:
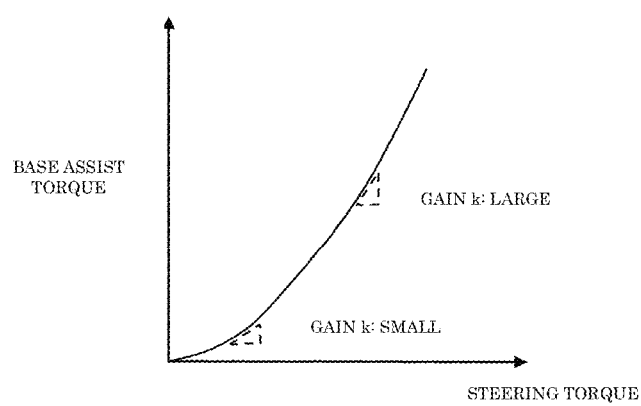
FIG. 8 is a graph illustrating correspondence between steering torque and base assist torque.

FIG. 8 is a graph illustrating correspondence between steering torque and base assist torque. The horizontal axis represents the steering torque (N·m), and the vertical axis represents the base assist torque (N·m). Base assist gain k is given by a slope defined by the ratio of a change amount in the base assist torque to a fluctuation amount in the steering torque. The base assist gain k is not constant because it generally changes in a manner of a quadratic curve. In particular, in the EPS, the base assist gain k increases in accordance with the steering torque of a driver. For this reason, along with the increase, a characteristic in which the gain crossover frequency shifts to the high frequency side is revealed.

As a conventional design method, a stabilizing compensator has been designed so that stability is ensured when the base assist gain k for base assist control is the highest. For example, the stabilizing compensator has been designed to ensure a phase margin of 40° or higher. Since the stabilizing compensator is designed with an emphasis on the stability, the phase lag increases. This conventional design has a problem in which the responsiveness tends to be insufficient when the base assist gain k is relatively low at the initial stage of steering. The insufficient responsiveness to the driver's steering leads to a delay of a response to the steering and, as a result, the driver may have a feeling of viscosity. The response delay is significant especially when the base assist gain k is relatively low at the initial stage of steering, and favorable responsiveness is required at this time. On the other hand, when the base assist gain k is relatively high, the phase margin is insufficient for the characteristic of the controlled target, which causes a problem of insufficient stability. In this manner, while the base assist gain k changes in accordance with the steering torque, the characteristic of the stabilizing compensator is fixed. Thus, the trade-off between the stability and the responsiveness is unsolved. For the above reasons, in a control device for an electric power steering device, it is desirable that both the responsiveness and the stability of the power assist control system are satisfied.

Based on the above findings, the present inventors have arrived at the present invention upon discovering that, in a control device for an electric power steering device, both responsiveness and stability can be satisfied by using a stabilizing compensator that has a transfer function, in which a frequency domain in which the responsiveness is emphasized is distinguished from a frequency domain in which the stability is emphasized, and in which a frequency characteristic is variable in accordance with a base assist gain k.

Hereinbelow, embodiments of a control device and a control method for an electric power steering device, and an electric power steering device including the control device according to the present disclosure will be described in detail with reference to the accompanying drawings. However, unnecessarily detailed description may be omitted. For example, detailed description of well-known matters and duplicate description of a substantially equal configuration may be omitted. The reason for this is to avoid unnecessary redundancy in the following description and facilitate understanding for those skilled in the art.

The following embodiments are illustrative, and the control device and the control method for an electric power steering device according to the present disclosure are not limited to the following embodiments. For example, the numerical values, the steps, the order of the steps, and the like illustrated in the following embodiments are only illustrative, and various modifications can be made unless any technical inconsistency occurs. The respective embodiments described below are illustrative, and various combinations are possible unless any technical inconsistency occurs.

Figure 1:
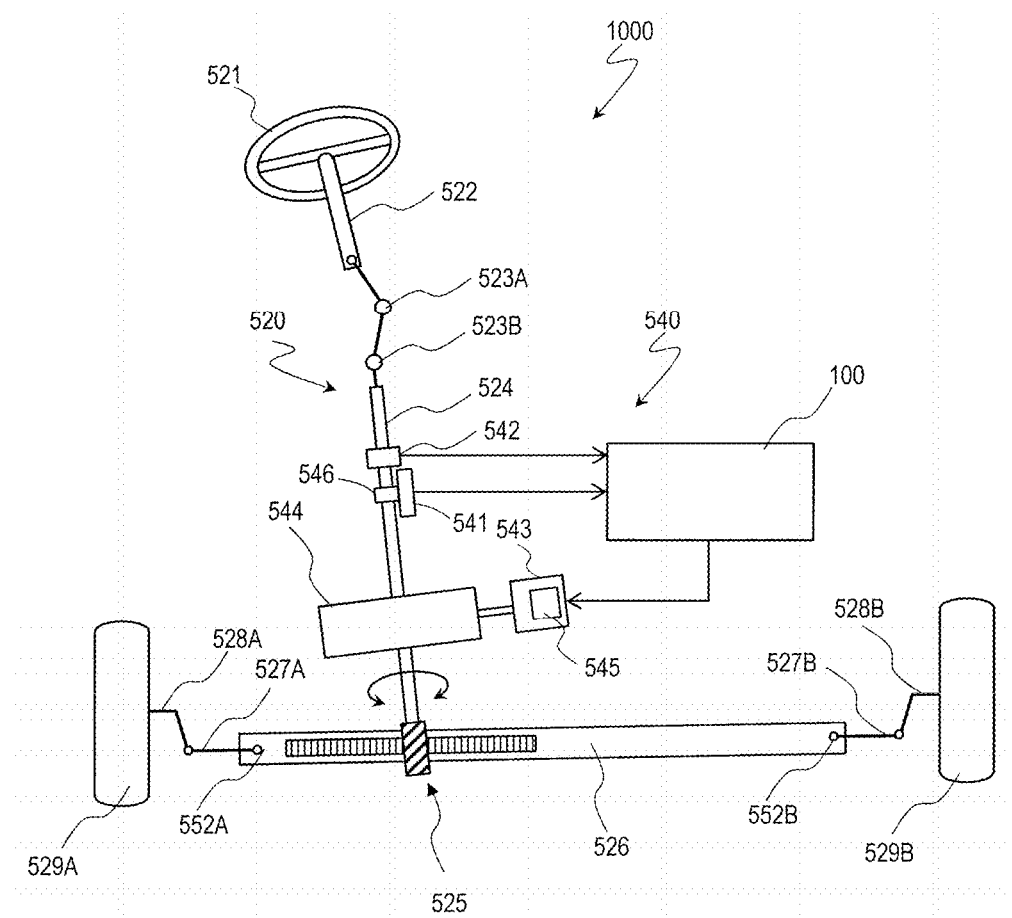
FIG. 1 schematically illustrates a configuration example of an electric power steering device 1000 according to the present embodiment.

FIG. 1 schematically illustrates a configuration example of an electric power steering device 1000 according to the present embodiment.

The electric power steering device 1000 (hereinbelow referred to as an "EPS") includes a steering system 520 and an assist torque mechanism 540 that generates assist torque. The EPS 1000 generates assist torque for assisting steering torque in the steering system generated when a driver operates a steering wheel handle. The assist torque reduces an operation load on the driver.

The steering system 520 includes a steering wheel handle 521, a steering shaft 522, universal joints 523A and 523B, a rotary shaft 524, a rack and pinion mechanism 525, a rack shaft 526, right and left ball joints 552A and 552B, tie rods 527A and 527B, knuckles 528A and 528B, and right and left steering wheels 529A and 529B, for example.

The assist torque mechanism 540 includes a steering torque sensor 541, a steering angle sensor 542, an electronic control unit (ECU) 100 for automobiles, a motor 543, a deceleration gear 544, an inverter 545, and a torsion bar 546, for example. The steering torque sensor 541 detects steering torque in the steering system 520 by detecting the amount of torsion of the torsion bar 546. The steering angle sensor 542 detects a steering angle of the steering wheel handle. Note that the steering torque may be an estimated value derived from calculation, not a value of the steering torque sensor.

The ECU 100 generates a motor driving signal based on detection signals detected by, for example, the steering torque sensor 541, the steering angle sensor 542, or a vehicle speed sensor (not illustrated) mounted on the vehicle, and outputs the motor driving signal to the inverter 545. For example, the inverter 545 converts direct-current power into three-phase alternating-current power having A-phase, B-phase, and C-phase pseudo sine waves in accordance with the motor driving signal and supplies the power to the motor 543. The motor 543 is, for example, a surface permanent-magnet synchronous motor (SPMSM) or a switched reluctance motor (SRM), and is supplied with the three-phase alternating-current power to generate assist torque corresponding to the steering torque. The motor 543 transmits the generated assist torque to the steering system 520 via the deceleration gear 544. Hereinbelow, the ECU 100 will be referred to as the control device 100 for the EPS.

The control device 100 and the motor are modularized and manufactured and sold as a motor module. The motor module includes the motor and the control device 100 and is suitably used for the EPS. Alternatively, the control device 100 may be manufactured and sold as a control device for controlling the EPS independently of the motor.

Figure 2:
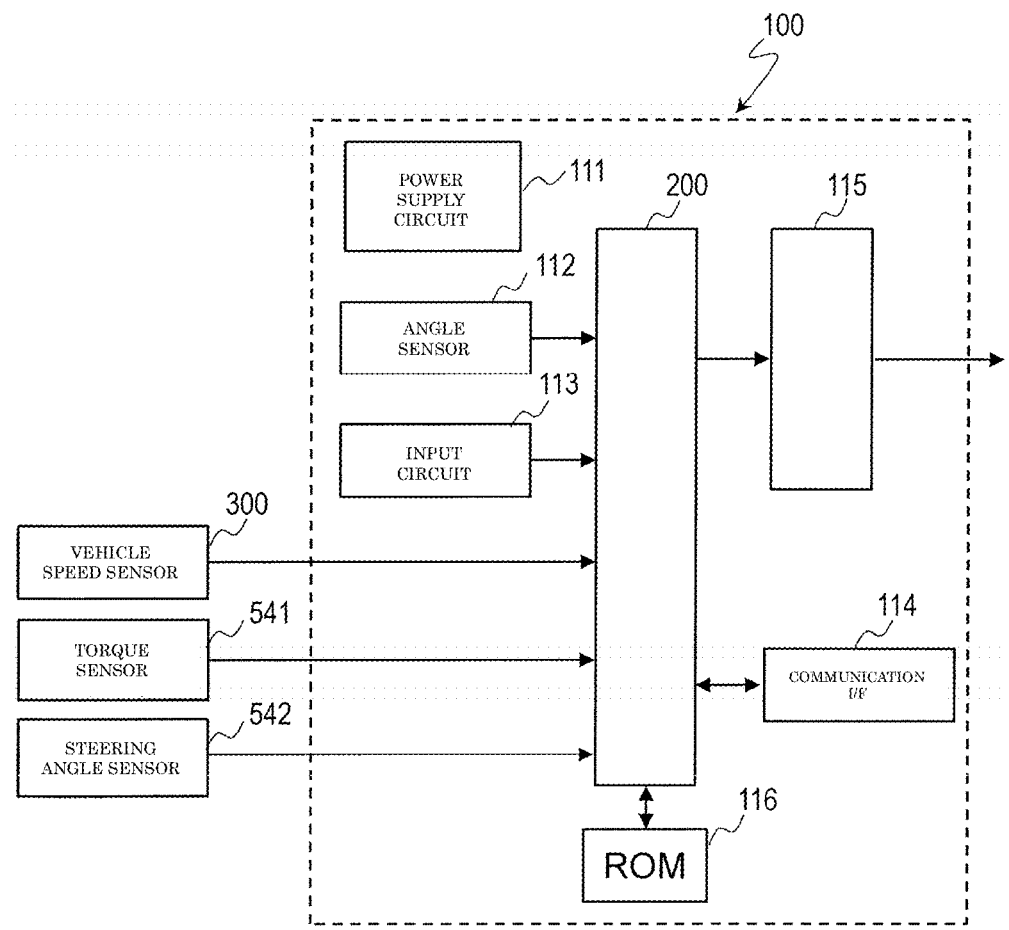
FIG. 2 is a block diagram illustrating a configuration example of a control device 100 according to the present embodiment.

FIG. 2 is a block diagram illustrating a typical example of a configuration of the control device 100 according to the present embodiment. The control device 100 includes a power supply circuit 111, an angle sensor 112, an input circuit 113, a communication I/F 114, a driving circuit 115, a ROM 116, and a processor 200, for example. The control device 100 can be achieved as a printed circuit board (PCB) on which these electronic components are implemented.

A vehicle speed sensor 300 mounted on the vehicle, the steering torque sensor 541, and the steering angle sensor 542 are electrically connected to the processor 200. The vehicle speed sensor 300, the steering torque sensor 541, and the steering angle sensor 542 transmit a vehicle speed v, steering torque $T_s$, and a steering angle $\theta$ to the processor 200, respectively.

The control device 100 is electrically connected to the inverter 545 (refer to FIG. 1). The control device 100 controls switching operations of a plurality of switch elements (for example, MOSFETs) included in the inverter 545. Specifically, the control device 100 generates control signals (hereinbelow referred to as "gate control signals")

for controlling the switching operations of the respective switch elements and outputs the gate control signals to the inverter 545.

The control device 100 generates a torque command value based on the vehicle speed v, the steering torque $T_s$, and the like and controls torque and rotation speed of the motor 543 by means of, for example, vector control. The control device 100 can perform not only the vector control but also other closed-loop control. The rotation speed is expressed as the number of times of rotation (rpm) of the rotor per unit time (for example, one minute) or the number of times of rotation (rps) of the rotor per unit time (for example, one second). The vector control is a method in which current flowing through the motor is separated into a current component that contributes to generation of torque and a current component that contributes to generation of magnetic flux, and in which the respective current components orthogonal to each other are independently controlled.

The power supply circuit 111 is connected to an external power supply (not illustrated) and generates DC voltage required for each block in the circuit. The DC voltage to be generated is, for example, 3V or 5V.

The angle sensor 112 is, for example, a resolver or a Hall IC. The angle sensor 112 is also achieved by a combination of an MR sensor having a magnetoresistive (MR) element and a sensor magnet. The angle sensor 112 detects a rotation angle of the rotor and outputs the rotation angle to the processor 200. The control device 100 may include a speed sensor and an acceleration sensor for detecting rotation speed and acceleration of the motor instead of the angle sensor 112.

The input circuit 113 receives a motor current value (hereinbelow referred to as an "actual current value") detected by a current sensor (not illustrated), converts the level of the actual current value into the input level for the processor 200 as needed, and outputs the actual current value to the processor 200. A typical example of the input circuit 113 is an analog-digital conversion circuit.

The processor 200 is a semiconductor integrated circuit and is also referred to as a central processing unit (CPU) or a microprocessor. The processor 200 sequentially executes a computer program that describes a command set for controlling motor driving stored in the ROM 116 and achieves desired processing. The processor 200 is widely interpreted as a term including a Field Programmable Gate Array (FPGA), an Application Specific Integrated Circuit (ASIC), or an Application Specific Standard Product (ASSP) equipped with a CPU. The processor 200 sets a target current value in accordance with the actual current value and the rotation angle of the rotor, generates a PWM signal, and outputs the PWM signal to the driving circuit 115.

The communication I/F 114 is an input/output interface for transmitting/receiving data in conformity with an in-vehicle control area network (CAN), for example.

The driving circuit 115 is typically a gate driver (or a pre-driver). The driving circuit 115 generates a gate control signal in accordance with the PWM signal and gives the gate control signal to the gates of the plurality of switch elements included in the inverter 545. In a case in which a driving target is a motor that can be driven at low voltage, the gate driver may not always be required. In this case, the functionality of the gate driver may be implemented in the processor 200.

The ROM 116 is electrically connected to the processor 200. The ROM 116 is a writable memory (for example, a PROM), a rewritable memory (for example, a flash memory or an EEPROM), or a read-only memory, for example. The ROM 116 stores a control program including a command set for causing the processor 200 to control motor driving. For example, the control program is once expanded in a RAM (not illustrated) at the time of booting.

Figure 3:
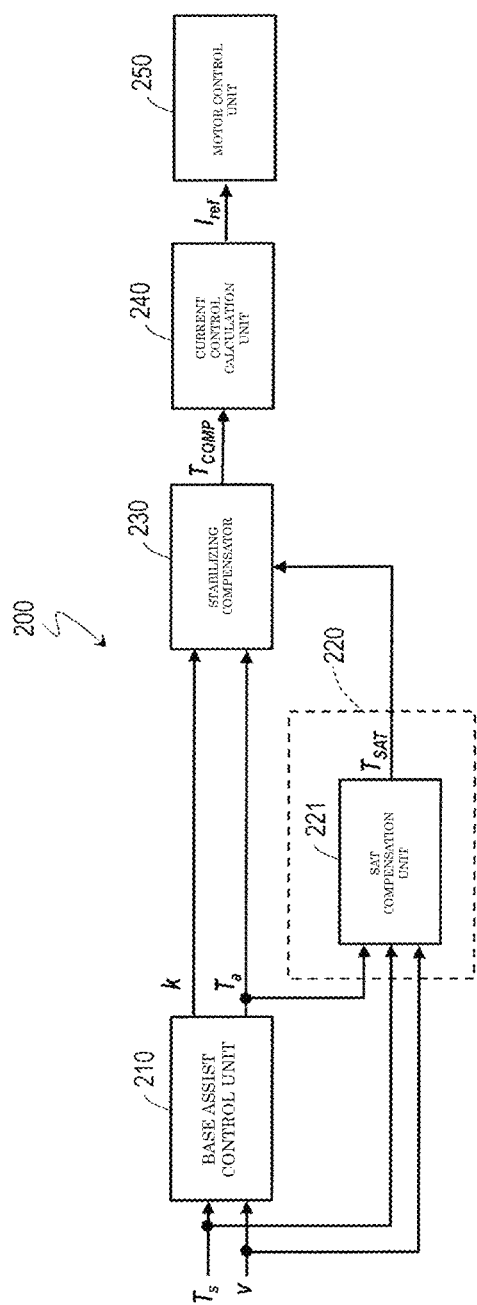
FIG. 3 is a functional block diagram illustrating functions implemented in a processor 200 in functional block units.

FIG. 3 is a functional block diagram illustrating functions implemented in the processor 200 in functional block units. The processor 200 herein includes, as functional blocks, a base assist control unit 210, a control addition processing unit 220, a stabilizing compensator 230, a current control calculation unit 240, and a motor control unit 250. However, the control addition processing unit 220 is not an essential block. Typically, processing (or a task) of each functional block corresponding to each unit is described in a computer program as a software module and is stored in the ROM 116. However, in a case of using the FPGA or the like, all or part of these functional blocks can be implemented as hardware accelerators.

In a case in which each functional block is implemented as software (or firmware) in the control device 100, a device that executes the software may be the processor 200. In one aspect, the control device according to the present disclosure includes the processor 200 and a memory that stores a program that controls the operation of the processor 200. The processor 200 executes the following processing in accordance with the program.

(1) The processor 200 determines the base assist gain k based on the steering torque $T_s$ and base assist torque $T_a$.

(2) The processor 200 generates stabilizing compensation torque $T_{comp}$ based on the base assist torque $T_a$, with use of the stabilizing compensator 230 having a second-order or higher transfer function in which a frequency characteristic is variable in accordance with the base assist gain k and which is expressed using a responsiveness parameter ω and a damping parameter ζ.

(3) The processor 200 generates a current command value $I_{ref}$ for use in control of the motor based on the stabilizing compensation torque $T_{comp}$.

(4) The processor 200 controls driving of the motor based on the current command value $I_{ref}$.

In a case in which the respective functional blocks are implemented as software and/or hardware in the control device 100, the control device 100 according to the present disclosure, in another aspect, includes: the base assist control unit 210 that determines the base assist gain k based on the steering torque $T_s$ and the base assist torque $T_a$; the stabilizing compensator 230 that has a second-order or higher transfer function in which a frequency characteristic is variable in accordance with the base assist gain k and which is expressed using the responsiveness parameter ω and the damping parameter ζ, and that generates the stabilizing compensation torque $T_{comp}$ based on the base assist torque $T_a$; the current control calculation unit 240 that generates the current command value $I_{ref}$ for use in control of the motor based on the stabilizing compensation torque $T_{comp}$; and the motor control unit 250 that controls the motor based on the current command value $I_{ref}$.

The processor 200 according to the present embodiment acquires as input data at least the steering torque $T_s$ detected by the steering torque sensor 541 and the vehicle speed v detected by the vehicle speed sensor. The processor 200 may further acquire the steering angle θ detected by the steering angle sensor 542 and other input data required for control of the rotation speed of the motor and the like.

The base assist control unit 210 acquires the steering torque $T_s$ and the vehicle speed v as input data. The base assist control unit 210 determines the base assist torque $T_a$ based on the steering torque $T_s$ and the vehicle speed v with reference to a table. A typical example of the table in the present embodiment is a so-called look-up table (LUT). The base assist control unit 210 further determines the base assist gain k based on a slope defined by the ratio of a change amount in the base assist torque $T_a$ to a fluctuation amount $T_d$ in the steering torque $T_s$.

Figure 4A:
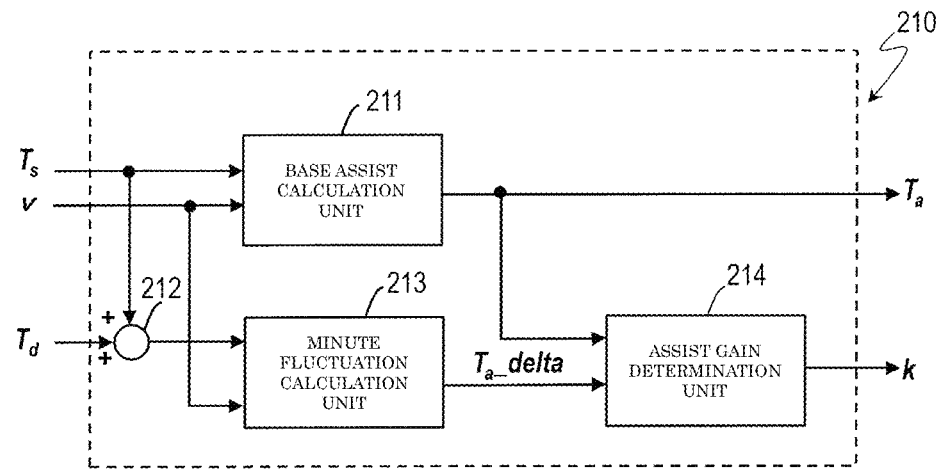
FIG. 4A is a functional block diagram illustrating a configuration example of a base assist control unit 210.

FIG. 4A is a functional block diagram illustrating a configuration example of the base assist control unit 210. The base assist control unit 210 illustrated in FIG. 4A includes a base assist calculation unit 211, an adder 212, a minute fluctuation calculation unit 213, and an assist gain determination unit 214. A typical example of the base assist calculation unit 211 is an LUT that defines the correspondence between the steering torque $T_s$ and the vehicle speed v, and the base assist torque $T_a$. The base assist calculation unit 211 determines the base assist torque $T_a$ based on the steering torque $T_s$ and the vehicle speed v with reference to the LUT.

The adder 212 adds the fluctuation amount $T_d$ for giving minute fluctuation for the steering torque to the steering torque $T_s$. For example, 0.4 N·m is input as the fluctuation amount $T_d$.

The minute fluctuation calculation unit 213 refers to the same LUT as one referred to in the base assist calculation unit 211 and determines base assist torque $T_a\_delta$ corresponding to the steering torque $(T_s+T_d)$ and the vehicle speed v, which are input data.

The assist gain determination unit 214 calculates the ratio of the change amount of the base assist torque $T_a$ to the fluctuation amount of the steering torque $T_s$ based on Formula 1 to determine the base assist gain k.

Base assist gain $k=(T_a\_delta-T_a)/T_d$      [Formula 1]

Figure 4B:
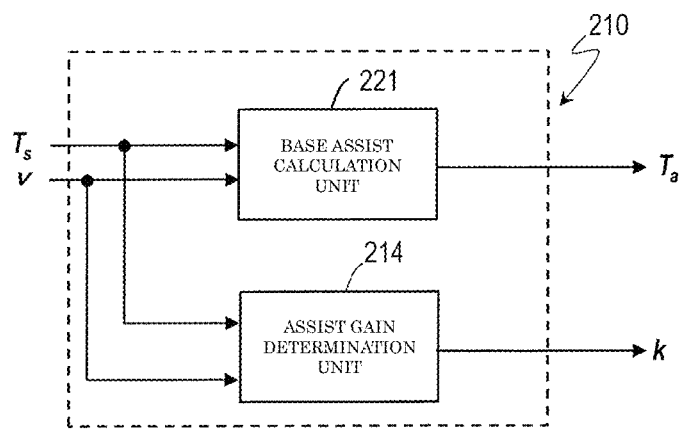
FIG. 4B is a functional block diagram illustrating another configuration example of the base assist control unit 210.

FIG. 4B is a functional block diagram illustrating another configuration example of the base assist control unit 210. The base assist control unit 210 illustrated in FIG. 4B includes the base assist calculation unit 211 and the assist gain determination unit 214. The LUT used in this configuration example holds, in advance, values for the base assist gain k, specifically, results of calculation executed by the aforementioned minute fluctuation calculation unit 213 as map data. The assist gain determination unit 214 can determine the base assist gain k corresponding to the steering torque $T_s$ and the vehicle speed v with reference to this LUT.

Figure 5:
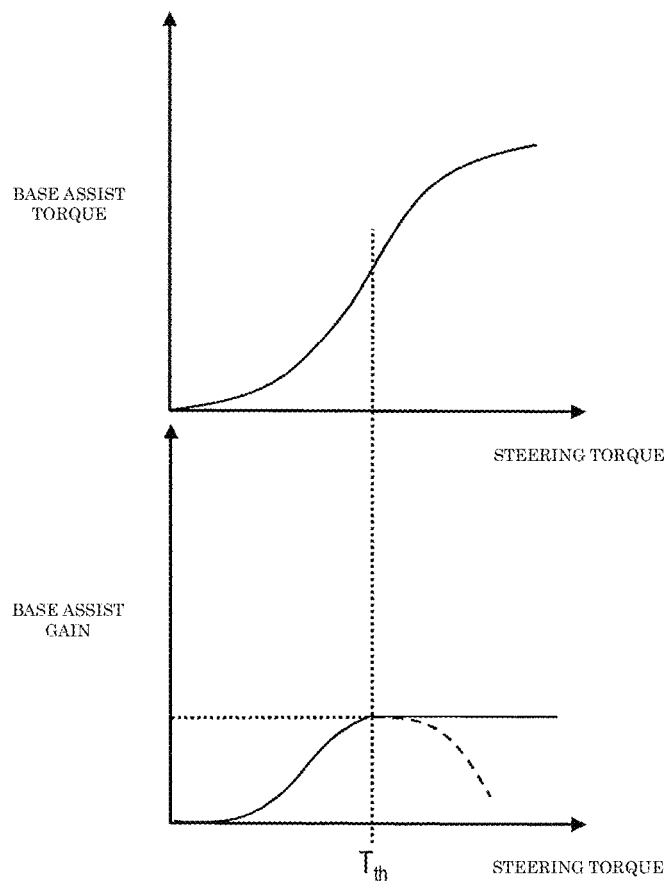
FIG. 5 is a diagram for describing a state in which a base assist gain k is clipped in a case in which steering torque $T_s$ is equal to or higher than a threshold value $T_{th}$.

FIG. 5 is a diagram for describing a state in which the base assist gain k is clipped in a case in which the steering torque $T_s$ is equal to or higher than a threshold value $T_{th}$. In a case in which the steering torque $T_s$ is equal to or higher than the threshold value $T_{th}$, the assist gain determination unit 214 employs, as the base assist gain k, a value for a base assist gain $k_{max}$ corresponding to the threshold value $T_{th}$. In a case in which the base assist gain k is lowered as illustrated by the dashed line in the figure, phase lead compensation by the stabilizing compensator 230 described below is not sufficiently applied and stability is not ensured, possibly resulting in, for example, vibration of the steering wheel handle. Conversely, by clipping the base assist gain k at the base assist gain $k_{max}$ and maintaining the phase lead by the stabilizing compensator 230, a sufficient phase margin can be ensured. As a result, the stability can be maintained.

Refer to FIG. 3, again.

The control addition processing unit 220 generates compensation torque, other than the base assist torque $T_a$, required for generating the current command value $I_{ref}$ or a torque command value $T_{ref}$ for use in control of the motor. For example, the control addition processing unit 220 may include a self-aligning torque (SAT) compensation unit 221.

The SAT compensation unit 221 compensates for static gain of self-aligning torque. The SAT compensation unit 221 acquires the steering torque $T_s$, the vehicle speed v, the base assist torque $T_a$, and the like as input data and generates and outputs self-aligning compensation torque $T_{SAT}$ based on these signals. The self-aligning torque is estimated from, for example, the balance of static forces around the steering wheel handle shaft between the base assist torque $T_a$ and the steering torque $T_s$. The SAT compensation unit 221 generates the self-aligning compensation torque $T_{SAT}$ by, for example, applying first-order phase lag compensation to the estimated self-aligning torque.

The stabilizing compensator 230 has a second-order or higher transfer function in which a frequency characteristic is variable in accordance with the base assist gain k. The stabilizing compensator 230 generates the stabilizing compensation torque $T_{comp}$ based on the base assist torque $T_a$. The second-order or higher transfer function is expressed using the responsiveness parameter $\omega$ and the damping parameter $\zeta$.

Figure 6:
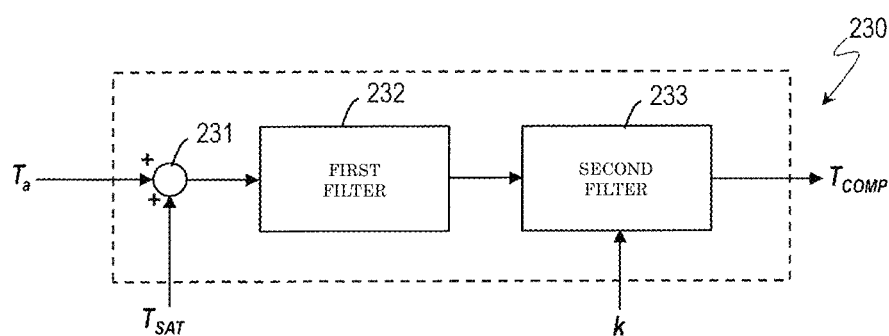
FIG. 6 is a functional block diagram illustrating a configuration example of a stabilizing compensator 230.

FIG. 6 is a functional block diagram illustrating a configuration example of the stabilizing compensator 230. The stabilizing compensator 230 according to the present embodiment includes an adder 231, a first filter 232, and a second filter 233. The first filter 232 and the second filter 233 are connected in cascade and can be implemented in the control device 100 as digital filters.

The adder 231 adds compensation torque for other control to the base assist torque $T_a$ output from the base assist control unit 210. In the present embodiment, the self-aligning compensation torque $T_{SAT}$ output from the SAT compensation unit 221 is input into the adder 231. That is, the adder 231 adds the self-aligning compensation torque $T_{SAT}$ to the base assist torque $T_a$.

The first filter 232 is applied to a torque addition value output from the adder 231. A frequency characteristic of the first filter 232 is provided as Formula 2. In Formula 2, s is a Laplace transformer, $f_1$ is a frequency for determining the zero point of the transfer function, and $f_2$ is a frequency for determining the pole of the transfer function. By setting the pole frequency to be higher than the zero point frequency, phase lead compensation can be applied. The longer the distance between the frequencies is, the larger the amount of phase lead becomes. The square root of the product of the zero point and the pole represents a frequency in which the phase advances most. By making adjustment so that the phase advances in a second resonance frequency of the steering system (resonance point caused by the steering wheel handle inertia and the motor inertia), the steering system can be stabilized. However, actually, a frequency characteristic of the second filter 233 also contributes to stabilization. Therefore, it is preferable to adjust both the frequency characteristic of the first filter 232 and the frequency characteristic of the second filter 233.

$$C_{SC2}(s) = \frac{s^2 + 2\zeta_1\omega_1 s + \omega_1^2}{s^2 + 2\zeta_2\omega_2 s + \omega_2^2}\left(\frac{\omega_2^2}{\omega_1^2}\right) \quad \text{[Equation 1]}$$

The second filter 233 is further applied to a torque addition value to which the first filter 232 is applied. A transfer function of the second filter 233 is expressed in Formula 3. The order number of the transfer function of the second filter 233 according to the present embodiment is two. By setting the order number of the transfer function to two, damping can be given to the characteristic of the transfer function. A phase characteristic can be adjusted by changing the damping. For example, by combining a second-order filter with a first-order filter, a stabilizing compensator having a third-order or higher transfer function is achieved.

$$C_{SC1}(s) = \frac{\frac{1}{2\pi f_1}s + 1}{\frac{1}{2\pi f_2}s + 1} \quad \text{[Equation 2]}$$

Here, s is a Laplace transformer, $\omega_1$ is a zero point frequency, $\omega_2$ is a pole frequency, $\zeta_1$ is zero point damping, and $\zeta_2$ is pole damping. In FIG. 7, the zero point means the intersection of the gain curve and the horizontal axis indicating 0 dB, and the zero point frequency corresponds to the above-mentioned gain crossover frequency. The pole means the maximum point of the gain curve, and the pole frequency corresponds to the peak frequency. The pole frequency $\omega_2$ is lower than the zero point frequency $\omega_1$.

A conventionally known stabilizing compensator has a characteristic in terms of the base assist gain opposite to that of an actual controlled target so as to cancel a peak of a resonance frequency of a resonance system of the controlled target. In contrast, according to the present embodiment, the transfer function of the second filter 233 is characterized in that (1) the phase lag is given, (2) the order number is two or higher, and (3) the responsiveness is given by $\omega$ and the phase margin is given by $\zeta$.

By setting the order number of the numerator in Formula 3 to two, the phase lag can be made larger even in the low frequency domain, which provides an advantage that a sufficient phase margin can easily be ensured in the high frequency domain. Also, the zero point damping $\zeta_1$ and the pole damping $\zeta_2$ are respectively variable in accordance with the base assist gain k. In other words, the damping $\zeta_1$ and $\zeta_2$ are expressed by the function of the base assist gain k. By adjusting the damping $\zeta_1$ and $\zeta_2$ in accordance with the base assist gain k, it is possible to adjust the phase lead/lag, the phase margin, and the gain crossover frequency, which are parameters that contribute to responsiveness and stability. For example, a frequency domain in which the responsiveness is emphasized is generally a low frequency domain at around, for example, 1 Hz, and requires the phase lag. Also, a frequency domain in which the stability is emphasized is approximately a high frequency domain around, for example, 60 to 100 Hz of the gain crossover frequency, and requires the phase margin. Since the respective frequency domains can be distinguished, by distinguishing the frequencies $\omega_1$ and $\omega_2$ for determining the pole and the zero point of the second-order transfer function and adjusting only the damping $\zeta_1$ and $\zeta_2$, the frequency domains in which the responsiveness and the stability are emphasized can be adjusted, respectively.

The stabilizing compensator 230 can increase the pole damping $\zeta_2$ as the base assist gain k increases and decrease the pole damping $\zeta_2$ as the base assist gain k decreases. By adjusting the pole damping $\zeta_2$, the phase lag can be applied to the low frequency domain around 1 Hz. For example, with respect to a reference value 1, the phase lag is larger by increasing the pole damping $\zeta_2$, and the phase lag is smaller by decreasing the pole damping $\zeta_2$. As a result, by adjusting the phase lag around, for example, 1 Hz, the responsiveness at the initial stage of steering can be improved.

The zero point damping $\zeta_1$ gives the phase margin to the high frequency domain around the gain crossover frequency $\omega_1$, and the pole damping $\zeta_2$ can also be used to adjust the gain crossover frequency $\omega_1$ itself. The stabilizing compensator 230 can decrease the zero point damping $\zeta_1$ as the base assist gain k increases. For example, by decreasing the zero point damping $\zeta_1$ with respect to a reference value $\zeta_1$, the phase lead in the gain crossover frequency $\omega_1$ can be larger, and as a result, a sufficient phase margin can be ensured. Also, by increasing the pole damping $\zeta_2$ with respect to the reference value 1, the gain at 10 Hz or higher can slightly be lowered, and the gain crossover frequency $\omega_1$ can thus be adjusted.

Refer to FIG. 3, again.

The current control calculation unit 240 generates a current command value $I_{ref}$ for use in control of the motor based on the stabilizing compensation torque $T_{comp}$. The motor control unit 250 sets a target current value based on the current command value $I_{ref}$ by means of, for example, vector control to generate a PWM signal and outputs the PWM signal to the driving circuit 115.

According to the present embodiment, in the control device for the EPS, the frequency domain in which the responsiveness is emphasized and the frequency domain in which the stability is emphasized are distinguished, and the responsiveness $\omega$ and the damping $\zeta$ of the stabilizing compensator can be adjusted independently. As a result, the response delay at the initial stage of steering can be improved, and a feeling of viscosity that the driver may feel can be reduced. In this manner, both the responsiveness and the stability of the power assist control system can be satisfied.

The embodiments of the present disclosure can be used for a control device for controlling an EPS mounted on a vehicle.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A control device for use in an electric power steering device including a motor and for controlling the motor, the control device comprising:
a processor; and
a memory that stores a program that controls operation of the processor, wherein
the processor executes, in accordance with the program,
determining base assist gain based on steering torque and base assist torque,
generating stabilizing compensation torque based on the base assist torque, with use of a stabilizing compensator that has a second-order or higher transfer function in which a frequency characteristic is variable in accordance with the base assist gain and which is expressed using a responsiveness parameter w and a damping parameter $\zeta$, and
generating a current command value for use in control of the motor based on the stabilizing compensation torque, and the transfer function is expressed as Formula 1, $$C_{SC2}(s) = \frac{s^2 + 2\zeta_1\omega_1 s + \omega_1^2}{s^2 + 2\zeta_2\omega_2 s + \omega_2^2}\left(\frac{\omega_2^2}{\omega_1^2}\right)$$

where s is a Laplace transformer, $\omega_1$ is a zero point frequency, $\omega_2$ is a pole frequency, $\zeta_1$ is zero point damping, and $\zeta_2$ is pole damping.

2. The control device according to claim 1, wherein the zero point damping $\zeta_1$ and the pole damping $\zeta_2$ in the Formula 1 are respectively variable in accordance with the base assist gain.

3. The control device according to claim 1, wherein the stabilizing compensator decreases the zero point damping $\zeta_1$ as the base assist gain increases.

4. The control device according to claim 1, wherein the stabilizing compensator increases the pole damping $\zeta_2$ as the base assist gain increases and decreases the pole damping $\zeta_2$ as the base assist gain decreases.

5. The control device according to claim 1, wherein the processor determines the base assist torque based on the steering torque and a vehicle speed with reference to a table, and determines the base assist gain based on a slope defined by a ratio of a change amount in the base assist torque to a fluctuation amount in the steering torque.

6. The control device according to claim 5, wherein, in a case in which the steering torque is equal to or higher than a threshold value, the processor employs, as the base assist gain, a value for a base assist gain corresponding to the threshold value for the steering torque.

7. A motor module comprising:
a motor; and
a control device for use in an electric power steering device including the motor and for controlling the motor, the control device comprising:
a processor, and
a memory that stores a program that controls operation of the processor, wherein the processor executes, in accordance with the program,
determining base assist gain based on steering torque and base assist torque,
generating stabilizing compensation torque based on the base assist torque, with use of a stabilizing compensator that has a second-order or higher transfer function in which a frequency characteristic is variable in accordance with the base assist gain and which is expressed using a responsiveness parameter w and a damping parameter $\zeta$, and
generating a current command value for use in control of the motor based on the stabilizing compensation torque, and
the transfer function is expressed as Formula 1, $$C_{SC2}(s) = \frac{s^2 + 2\zeta_1\omega_1 s + \omega_1^2}{s^2 + 2\zeta_2\omega_2 s + \omega_2^2}\left(\frac{\omega_2^2}{\omega_1^2}\right)$$

where s is a Laplace transformer, $\omega_1$ is a zero point frequency, $\omega_2$ is a pole frequency, $\zeta_1$ is zero point damping, and $\zeta_2$ is pole damping.

8. A control method for use in an electric power steering device including a motor and for controlling the motor, the control method comprising:
determining base assist gain based on steering torque and base assist torque;
generating stabilizing compensation torque based on the base assist torque, with use of a stabilizing compensator that has a second-order or higher transfer function in which a frequency characteristic is variable in accordance with the base assist gain and which is expressed using a responsiveness parameter w and a damping parameter $\zeta$; and
generating a current command value for use in control of the motor based on the stabilizing compensation torque, wherein
the transfer function is expressed as Formula 1, $$C_{SC2}(s) = \frac{s^2 + 2\zeta_1\omega_1 s + \omega_1^2}{s^2 + 2\zeta_2\omega_2 s + \omega_2^2}\left(\frac{\omega_2^2}{\omega_1^2}\right)$$

where s is a Laplace transformer, $\omega_1$ is a zero point frequency, $\omega_2$ is a pole frequency, $\zeta_1$ is zero point damping, and $\zeta_2$ is pole damping.

* * * * *